J. L. WOODBRIDGE.
ELECTRICAL SYSTEM OF DISTRIBUTION.
APPLICATION FILED SEPT. 29, 1911.
1,078,654.
Patented Nov. 18, 1913.
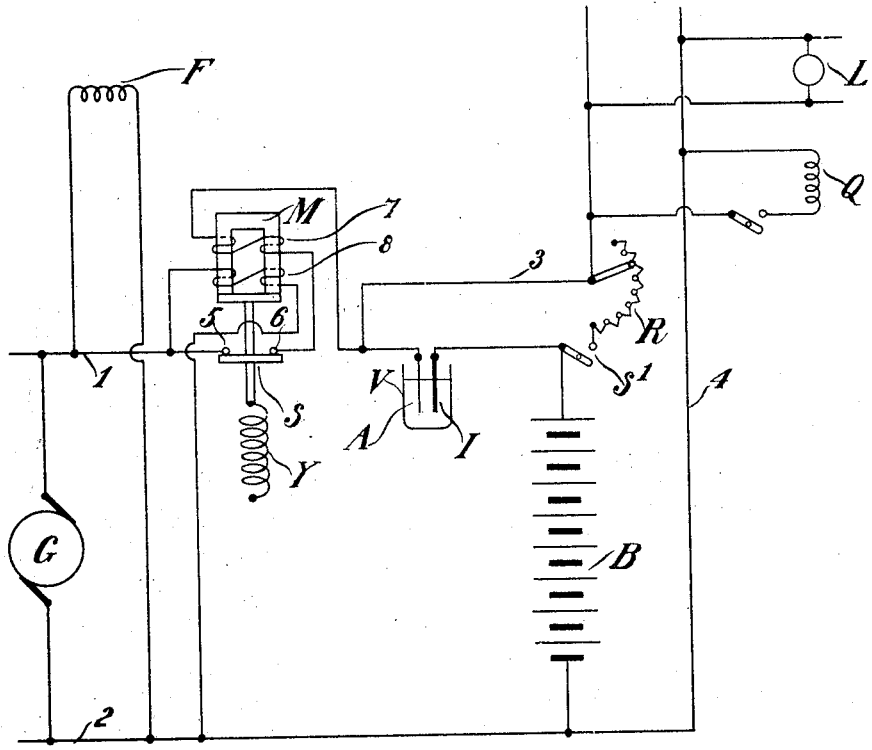
Inventor
Joseph L. Woodbridge
by
Augustus B Stoughton
Attorney

UNITED STATES PATENT OFFICE.

JOSEPH LESTER WOODBRIDGE, OF PHILADELPHIA, PENNSYLVANIA.

ELECTRICAL SYSTEM OF DISTRIBUTION.

1,078,654.　　　　Specification of Letters Patent.　　Patented Nov. 18, 1913.

Application filed September 29, 1911. Serial No. 651,941.

*To all whom it may concern:*

Be it known that I, JOSEPH LESTER WOODBRIDGE, a citizen of the United States, and a resident of Philadelphia, in the county of Philadelphia, State of Pennsylvania, have invented certain new and useful Improvements in Electrical Systems of Distribution, of which the following is a specification.

My invention relates to systems in which there is a primary direct current circuit of variable voltage, such as the exciter circuit of an alterating current power house, to which is connected a secondary circuit for supplying current to certain apparatus, such as solenoids for operating oil switches and signal lamps. In such systems it is customary to use a storage battery for supplying current to the secondary circuit in case of any interruption on the primary circuit. On account of the variation of voltage on the primary circuit, it is necessary, if the battery is to be connected at all times to the circuit, to provide some means for preventing the battery from charging and discharging with variations in the circuit voltage; otherwise the battery must remain disconnected from the circuit, and some automatic switch be relied on to make the connection in case of trouble. In such a system, arranged in accordance with my invention, the battery is connected to the secondary circuit through the medium of an electrolytic valve, the voltage of the battery being less than the minimum voltage occurring on the circuit during ordinary operation. The valve prevents current from flowing into the battery from the circuit, but upon an abnormal reduction of the circuit voltage permits the battery to discharge into the circuit. I have also shown an automatic switch for disconnecting the secondary circuit from the primary circuit in case of an interruption on the latter.

My invention will be more clearly understood by reference to the accompanying drawing, which is a diagrammatic representation of a system embodying features of the invention and in which—

G is a generator supplying current to the primary circuit 1—2, which may be the exciter circuit of an alternating current station supplying current to the fields of the alternators, of which one is represented at F.

3—4 represents the secondary circuit to which are connected signal lamps, such as shown at L, and a solenoid Q which represents the solenoid of a remote control oil switch. A storage battery B is shown connected at one end to the conductor 4, and at the other end through an electrolytic valve V to conductor 3. This valve may be constructed in the well known manner with one aluminum plate A and one iron plate I immersed in suitable electrolyte, such as a solution of borate of ammonium. It is the well known characteristic of such a valve to permit current to flow from the iron plate to the aluminum plate but to prevent flow of current in the opposite direction. An automatic switch S is shown which, when closed, as shown, connects the conductors 1 and 3 at the contacts 5 and 6. Switch S is held closed by an electromagnet M which is provided with two windings 7 and 8. The winding 8 is connected across the circuit 1—2 and serves to hold the switch closed except when its effect is opposed by that of the winding 7. The latter winding is connected in series between conductor 1 and conductor 3, and when the current flow is in the direction from 1 to 3, this winding coöperates with winding 8 to hold the switch closed. If, however, the flow of current in winding 7 is reversed, which would occur if the voltage of the generator G drops sufficiently to permit the battery to discharge back into the circuit 1—2, the effect of winding 7 will be to oppose winding 8, and release the switch which will then be opened by the spring Y, thus disconnecting conductor 1 from conductor 3. Current will then be furnished by the battery B to the circuit 3—4 through the valve V, thus avoiding any interruption of the power supply to this circuit. The field winding F, being connected to the primary circuit 1—2, is also disconnected from the battery by opening the switch S, so that the battery need not be of sufficient capacity to supply this field current.

A rheostat R and a switch S¹ are shown in the circuit connected around the valve V. When the switch S¹ is closed, the battery B may be charged through the rheostat R.

Having described my invention what I claim, and desire to secure by Letters Patent is—

1. In combination, a direct current source of varying voltage, a consumption circuit connected to the source, a storage battery connected to said circuit and of voltage normally lower than that of the source, and an electrolytic valve connected between the battery and the circuit in the direction to oppose the flow of charging current from the source but to permit the flow of discharge current between the battery and the circuit upon interruption of the source.

2. In combination, a direct current circuit of varying voltage, a storage battery connected thereto, an electrolytic valve connected between the battery and the circuit in the direction to oppose the flow of charging current but permit the flow of discharge current between the battery and the circuit, and a circuit in parallel with the electrolytic valve containing appropriate resistance for charging the battery from the first named circuit.

3. In combination, an electric circuit, a variable voltage source connected thereto, consumption apparatus supplied therefrom, a storage battery connected to the circuit, an electrolytic valve interposed between the battery and the circuit in the direction to oppose the flow of charging current but permit the flow of discharge current between the battery and the circuit, and an automatic switch actuated by discharge current from the battery, and adapted to disconnect the source from the circuit.

4. In combination, an electric circuit, a variable voltage source connected thereto, consumption apparatus supplied therefrom, a storage battery connected to the circuit, an electrolytic valve interposed between the battery and the circuit in the direction to oppose the flow of charging current but permit the flow of discharge current between the battery and the circuit, and an automatic switch actuated by discharge current from the battery and adapted to disconnect the source and a part of the consumption apparatus from the circuit.

5. In combination, an electric circuit, a variable voltage source connected thereto, consumption apparatus supplied therefrom, a storage battery connected to the circuit, an electrolytic valve interposed between the battery and the circuit in the direction to oppose the flow of charging current but permit the flow of discharge current between the battery and the circuit, and an automatic switch adapted to disconnect the source from the circuit.

6. In combination, an electric circuit, a variable voltage source connected thereto, consumption apparatus supplied therefrom, a storage battery connected to the circuit, an electrolytic valve interposed between the battery and the circuit in the direction to oppose the flow of charging current but permit the flow of discharge current between the battery and the circuit, and an automatic switch adapted to disconnect the source and a part of the consumption apparatus from the circuit.

In testimony whereof I have hereunto signed my name.

J. LESTER WOODBRIDGE.

Witnesses:
J. H. TRACY,
F. G. BEETEM.